(12) United States Patent
Olafsson et al.

(10) Patent No.: US 6,278,744 B1
(45) Date of Patent: Aug. 21, 2001

(54) SYSTEM FOR CONTROLLING AND SHAPING THE SPECTRUM AND REDUNDANCY OF SIGNAL-POINT LIMITED TRANSMISSION

(75) Inventors: Sverrir Olafsson, Seltjarnarnes (IS); Zhenyu Zhou; Xuming Zhang, both of Irvine, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 08/756,383

(22) Filed: Nov. 26, 1996

Related U.S. Application Data

(63) Continuation-in-part of application No. 08/746,731, filed on Nov. 15, 1996, now Pat. No. 6,192,087.

(51) Int. Cl.$^7$ .......................... H04L 25/49; H04B 14/04
(52) U.S. Cl. ................................ 375/296; 375/254
(58) Field of Search .................... 375/253, 254, 375/285, 242, 295, 296, 346, 222, 258; 341/55, 59

(56) References Cited

U.S. PATENT DOCUMENTS

| | | | |
|---|---|---|---|
| 4,071,692 | * 1/1978 | Weir et al. | 375/242 |
| 4,387,364 | * 6/1983 | Shirota | 341/55 |
| 4,486,739 | * 12/1984 | Franaszek et al. | 341/59 |
| 5,249,200 | 9/1993 | Chen et al. | 375/296 |
| 5,388,092 | 2/1995 | Koyama et al. | 379/411 |
| 5,450,443 | 9/1995 | Siegel et al. | 375/286 |
| 5,528,625 | * 6/1996 | Ayanoglu et al. | 375/222 |
| 5,644,601 | * 7/1997 | Kawaguchi | 375/296 |
| 5,646,958 | 7/1997 | Tsujimoto | 375/233 |
| 5,649,012 | 7/1997 | Gupta et al. | 379/410 |
| 5,651,028 | 7/1997 | Harris et al. | 375/286 |
| 5,657,356 | 8/1997 | Ozaki | 375/346 |
| 5,659,576 | 8/1997 | Critchlow et al. | 375/219 |
| 5,659,584 | 8/1997 | Uesugi et al. | 375/347 |
| 5,668,871 | 9/1997 | Urbanski | 379/406 |

(List continued on next page.)

OTHER PUBLICATIONS

"A Comparison of CSS and Maximum Inversion", Vedat Eyuboglu, Telecommunications Industry Association (TIA), Oct. 14–16, 1997.
"Lookahead Frames for Spectral Shaping", Behman Barazesh, ITU—Telecommunications Standardization Sector, Dec. 3–5, 1997.
Telecommunications Industry Association (TIA), TR30.1 Ad–Hoc Group Contribution, "A Spectral Shaping Technique for PCM Modems" (Nov. 13–15, 1996).
Telecommunications Industry Association (TIA), Technical Commitee TR–30 Meetings, "DC Suppresser For 56K Modems" (Oct. 16–17, 1996).
Telecommunications Industry Association (TIA), Technical Commitee TR–30.1 PCM Modem Ad Hoc Group Meeting, "DC Suppresser For PCM Modems" (Nov. 13–15, 1996).

*Primary Examiner*—Tesfaldet Bocure
(74) *Attorney, Agent, or Firm*—Snell & Wilmer

(57) ABSTRACT

A method and apparatus for controlling and shaping the spectrum of transmitted signal samples having predetermined frequency characteristics and allowable transmit signal levels. A running measure of unwanted components is measured and, for each block of the transmitted samples, an objective function based on the previously calculated running measure is computed. Depending upon the measurements, redundancy is determined and selected for each block of the transmitted samples. Accordingly, at least one redundant sample may be added or, the sign of the sample modified, at structured or randomized locations within the block to optimize the objective function.

22 Claims, 9 Drawing Sheets

U.S. PATENT DOCUMENTS

| | | | |
|---|---|---|---|
| 5,673,288 | 9/1997 | Okanoue | 375/231 |
| 5,680,393 | 10/1997 | Bourmeyster et al. | 370/286 |
| 5,680,450 | 10/1997 | Dent et al. | 379/388 |
| 5,680,451 | 10/1997 | Betts et al. | 379/410 |
| 5,682,378 | 10/1997 | Betts et al. | 370/286 |
| 5,684,792 | 11/1997 | Ishihara | 370/286 |
| 5,684,836 | 11/1997 | Nagayasu et al. | 375/326 |
| 5,684,839 | 11/1997 | Smith et al. | 375/348 |
| 5,687,198 | 11/1997 | Sexton et al. | 375/347 |
| 5,687,229 | 11/1997 | Sih | 379/410 |
| 5,691,893 | 11/1997 | Stothers | 364/148.01 |
| 5,694,416 | 12/1997 | Johnson | 375/266 |
| 5,694,437 | 12/1997 | Yang et al. | 375/346 |
| 5,701,332 | 12/1997 | Decrouez | 375/334 |
| 5,706,314 | 1/1998 | Davis et al. | 375/340 |
| 5,710,798 | 1/1998 | Campana, Jr. | 375/347 |
| 5,710,799 | 1/1998 | Kobayashi | 375/349 |
| 5,717,717 | 2/1998 | Yang et al. | 375/232 |
| 5,717,725 | 2/1998 | Campana, Jr. | 375/347 |
| 5,717,768 | 2/1998 | Laroche | 381/66 |
| 5,719,852 | 2/1998 | Schilling et al. | 370/201 |
| 5,721,730 | 2/1998 | Genter | 370/288 |
| 5,721,782 | 2/1998 | Piket et al. | 381/66 |
| 5,724,393 | 3/1998 | Dagdeviren | 375/296 |
| 5,732,134 | 3/1998 | Sih | 379/406 |
| 5,734,676 | 3/1998 | Dingsor | 375/222 |
| 5,734,684 | 3/1998 | Matsui | 375/340 |
| 5,734,715 | 3/1998 | Scalart et al. | 379/410 |
| 5,742,591 | 4/1998 | Himayat et al. | 370/286 |
| 5,742,642 | 4/1998 | Fertner | 375/233 |
| 5,745,524 | 4/1998 | Hull | 375/244 |
| 5,748,674 | 5/1998 | Lim | 375/233 |
| 5,751,114 | 5/1998 | Dingsor | 375/222 |
| 5,754,587 * | 5/1998 | Kawaguchi | 375/296 |
| 5,757,866 | 5/1998 | Kannari et al. | 375/347 |
| 5,761,243 | 6/1998 | Russell et al. | 375/233 |
| 5,768,291 | 6/1998 | Kelton et al. | 371/30 |
| 5,774,505 | 6/1998 | Baugh | 375/348 |
| 5,777,544 | 7/1998 | Vander Mey et al. | 340/310.06 |

\* cited by examiner

SYSTEM FOR CONTROLLING AND SHAPING THE SPECTRUM AND REDUNDANCY OF SIGNAL-POINT LIMITED TRANSMISSION

CROSS-REFERENCE TO RELATED APPLICATIONS

The present application is a continuation-in-part of application Ser. No. 08/746,731, filed Nov. 15, 1996, the disclosure of which is incorporated herein by reference.

FEDERALLY SPONSORED RESEARCH OR DEVELOPMENT

Not Applicable

BACKGROUND OF THE INVENTION

The present invention relates to transmission of digital information over an analog medium connected to a digital network and more particularly to Pulse Code Modulation (PCM) modems.

The world based on the Internet has seen tremendous growth in recent months. As more users begin browsing and downloading information from the World Wide Web, there has been a great desire to increase the data transmission rate, or simply called data rate. The desire is even greater for users accessing the Internet through an Internet service provider (ISP), since most users are linked up to the "Net" through a personal computer and a modem. Conventional analog modems, such as V.34 modems, however, view the public switched telephone network ("PSTN") as an analog channel, even though the signals are digitized for communications throughout most of the PSTN. As such, various effects of and impairments due to signal quantization impose a limitation on the data rate of the channel to about 35 Kbps. This limit has been commonly known as Shannon's Limit. (See C. E. Shannon and W. Weaver, *The Mathematical Theory of Communication*, University of Illinois Press, 1949).

There has been much recent development of high-speed communications technology based on PCM modems, where data rates of at least 56 Kbps are said to be actually attainable. The PCM modem technology is based on the simple realization that the PSTN is increasingly a digital network and not an analog network. Also, more and more central site modems are connected to the PSTN through digital connections, i.e., T1in the U.S. and E1 in Europe, without requiring a CODEC (coder/decoder). A CODEC is a device which connects the digital portion of the network to the analog local loop and converts between analog and digital.

The conventional modem, however, still interprets this digital stream as the representation of the modem's analog signal. With the PCM modems, however, a much higher data rate can be achieved without the complicated task of re-wiring the user's site or modifying the telephone network. It should be recognized that "central site" modems refer to those modems installed at an ISP, or at a corporation, for example, to allow many simultaneous connections for remote local area network (LAN) access.

The recent 56 Kbps technology seeks to address an impaired section of the communications path of the PSTN digital network, where the impairment is due to the hybrid and the copper wire interface between the telephone central office and the user's home, usually referred to as the analog local loop.

Since recently, much has been described about PCM modems and how they can and should facilitate downstream data communication at a much higher rate than the present paradigm. For example, the PCM modem has been the subject of a recent Telecommunications Industry Association (TIA) Technical Committee TR-30 Standards meeting on Oct. 16–17, 1996. The submitted technical contributions include Guozhu Long's *DC Suppresser for 56K Modems*, David C. Rife's *56 Kbps Channels*, Veda Krishnan's *V.pcm Modem Standard*, Vedat Eyuboglu's *PCM Modems: A Technical Overview*, Richard Stuart's *Proposal for a High Speed Network Access Modem*, and Vladimir Parizhsky's *U.S. Robotics' x2 Technology: Technical Brief*. These contributions are hereby incorporated by reference.

Also, there have been recent publications on the overall data communication system based on the PCM modem. The first one is a 1995 presentation disclosed by Pierre A. Humblet and Markos G. Troulis at Institute Eurecom, entitled The *Information Driveway*, 1995, which purports to explain the basic concepts on the high speed modem. The second one is a PCT Patent Publication, dated Jun. 13, 1996, International Publication Number WO/9618261, by Brent Townshend, which discloses a High Speed Communications Systems for Analog Subscriber Connections. This Publication, on pages 17–19, discloses an overall high speed system based on PCM modems, which also implements DC null elimination on the transmitter side. These papers provide a fair reference to the basics of the high speed PCM modems and their environment, and are hereby incorporated by reference.

Additionally, U.S. Pat. No. 5,528,625, issued to Ender Ayanoglu of AT&T, dated Jun. 18, 1996, entitled High Speed Quantization-Level-Sampling Modem With Equalization Arrangement, discloses a QLS modem for high-speed data communication. Another U.S. patent also issued to Ender Ayanoglu of AT&T, U.S. Pat. No. 5,394,437, dated Feb. 28, 1995, entitled High-Speed Modem Synchronized To A Remote CODEC, discloses a high-speed modem for data transmission over an analog medium in tandem with a digital network. These references are also hereby incorporated by reference.

FIG. 1 depicts a conceptual diagram of the typical high-speed communication path using PCM modem technology. An ISP, or central site, 100 is digitally connected to a telephone network 130 through its transmitter 110 and receiver 120. The network 130 is connected to a local loop 150 through a central office line card 140. The line card typically has a PCM CODEC implemented therein. The local loop 150 is connected to the user's PC at the user's site through the user's modem 160. As can be appreciated by those skilled in the art, the connection between the ISP modem transmitter 110 to the telephone network 130 is a digital connection with a typical data rate of about 64 Kbps. Since the parameters of the telephone network 130 and line card 140 are dictated and set by the telephone company's specifications and operation, the central site transmitter 110 needs to transmit the digital data in a particular way to fully exploit its digital connection to the network. However, dealing with the central site transmitter in this new paradigm has some obstacles.

In this type of data communication systems, such as that including the transmitter 110 in the central site, the transmit signal points are determined by physical constraints, and cannot be made part of the overall transmitter design. An example is when a signal is transmitted from within the digital part of the telephone network to the residential customer. That system will be the focus of the following description, although the methods described hereinafter will in many cases be applicable to other systems.

The transmitter 110 sends 64 Kbps of data into the network 130, which is eventually translated to an analog signal in a digital-to-analog converter in the central office line-card CODEC 140. To send the maximum of 64 Kbps of data, all transmitted bits must be determined by the incoming data. Any modification of the outgoing sequence of bits resulting in correlation between the bits represents redundancy in the signal, and will thus result in a lower data rate. Therefore, if the analog signal is to be controlled in any way, the data rate must be lowered. The main task confronting designers, then, is to perform the desired control with the least amount of redundancy added.

Impairments Presented by the Communication Channel

There are other difficulties from the channel which affect the implementation of the PCM modem and the information transmission. The communication channel from the line card PCM CODEC to the user's modem can be characterized by four primary functional units: the CODEC's anti-aliasing filter, the line card circuit, the subscriber loop and the modem's input circuit.

First, the CODEC anti-aliasing filter is mostly flat, and starts to attenuate the signal at about 3.5 kHz, increasing to 15–20 dB at 4 kHz.

Second, the line card circuit is in some ways the most challenging impairment. It is difficult to characterize, since there are many types in use, and it has been designed to transmit a voice signal rather than a data signal. The hybrid transformer circuit includes a null at 0 Hz, and may induce high levels of nonlinear distortion, especially on signals with low-frequency energy.

Third, the subscriber loop itself is generally a linear impairment, creating inter-symbol interference (ISI) and picking up largely Gaussian noise. Non-Gaussian noise sources are near-end crosstalk ("NEXT"), far-end crosstalk ("FEXT") and single frequency interference (SFI). The prime source of SFI is the electricity distribution network, adding a 50 or 60 Hz tone to the signal.

Finally, the modem input circuit consists of a line interface, including a hybrid transformer, and an analog-to-digital converter (ADC). The hybrid introduces a null in the spectrum at 0 Hz, and may also induce nonlinearities. However, since the signal level at the modem end is lower than at the central office, and the transformer can be part of the receiver design, nonlinear distortion in the modem input circuit will generally be minimal compared to that added by the central office line card. While the ADC will of course add quantization noise, which can be made negligible by design, many ADCs will add Gaussian-type noise, often with a "1/f" spectral characteristic, i.e., with highest energy at the low-frequency end of the spectrum. Also, a DC offset can be expected in the ADC, requiring some compensation by the receiver.

Given these impairments, it might seem difficult to take advantage of the low-end of the spectrum. The two transformer hybrids introduce nulls at 0 Hz, SFI is mostly around 50–60 Hz, and nonlinear distortion is increased if energy is transmitted at low frequencies (and will extend into higher frequencies). ADC noise also tends to be most prevalent at low frequencies.

Thus, it is desirable to simplify the receiver design by having the transmitter avoid sending energy at low frequencies. Without the low frequency energy, the receiver may elect to simply implement a high-pass filter to filter out noise without the need to reconstruct the signal component removed.

In the following disclosure of the present invention, methods will be disclosed for controlling the sequence of bits transmitted to the line card CODEC to eliminate as much energy as possible at low frequencies. For illustration purposes, the following disclosure will assume a redundancy of 4 Kbps, where 4 Kbps out of the 64 Kbps are generated based on the other bits. Generally, a higher redundancy may improve the performance, and the methods disclosed herein can readily be modified for a different level of redundancy.

BRIEF SUMMARY OF THE INVENTION

A method and apparatus for shaping and controlling the spectrum of transmitted samples with a set of predetermined frequency characteristics and a predetermined set of allowable transmitted signal levels are disclosed. As will be described below, methods and apparatus for controlling the spectrum of the line CODECs output signal are disclosed. In particular, methods of minimizing the energy of the signal at unwanted frequencies are described. These methods can be readily extended to other parts of the spectrum by those skilled in the art based on the teaching of the present invention.

More particularly, the method first calculates, for each of the transmitted samples, a running measure of unwanted components up to the current sample. It then computes, for each block of the transmitted samples, an objective function based on the running measure previously calculated. It then selects, for each block of the transmitted samples, at least one redundant sample to be added, or at least one transmitted sample to be modified, at structured or randomized locations within the block of samples to optimize the objective function. The location of the dependent sample can further be fixed, scrambled (pseudo- random) or randomized. The method of computing can be any one of the following: a Running Filter Sum, a Running Fourier Transform ("RFT") or Fast FT ("RFFT"), or an RDS, among other methods of computation, for each transmitted sample.

BRIEF DESCRIPTION OF THE DRAWINGS

Additional objects, advantages and features of the present invention will be disclosed in the following description, wherein.

DETAILED DESCRIPTION OF THE INVENTION

Methods and apparatus for spectrum control and shaping in signal-point limited transmission systems are disclosed. In the following description, various aspects of the present invention are presented in terms of process flows, functional block diagrams and even mathematical expressions, which are the ways those skilled in the art communicate with each other in conveying their ideas and designs.

Figure 1:
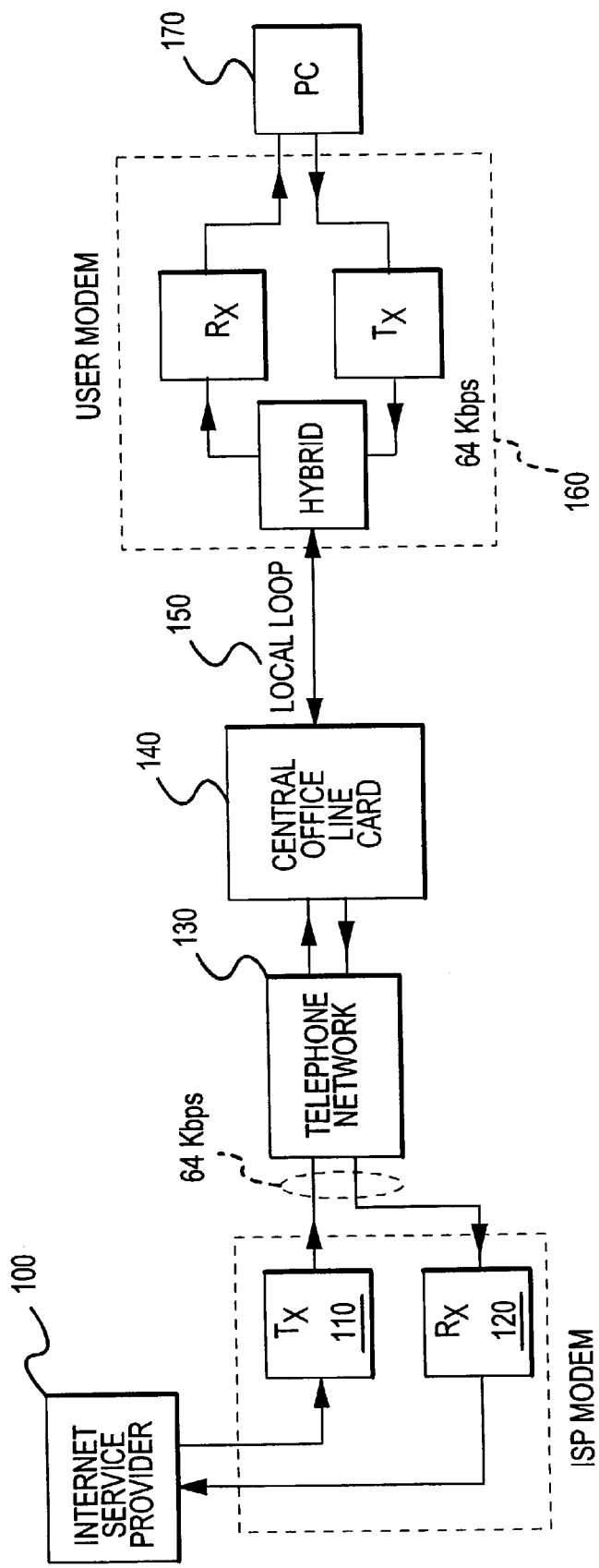
FIG. 1 depicts a conceptual diagram of the high-speed communication path using the PCM modem technology.
Figure 2:
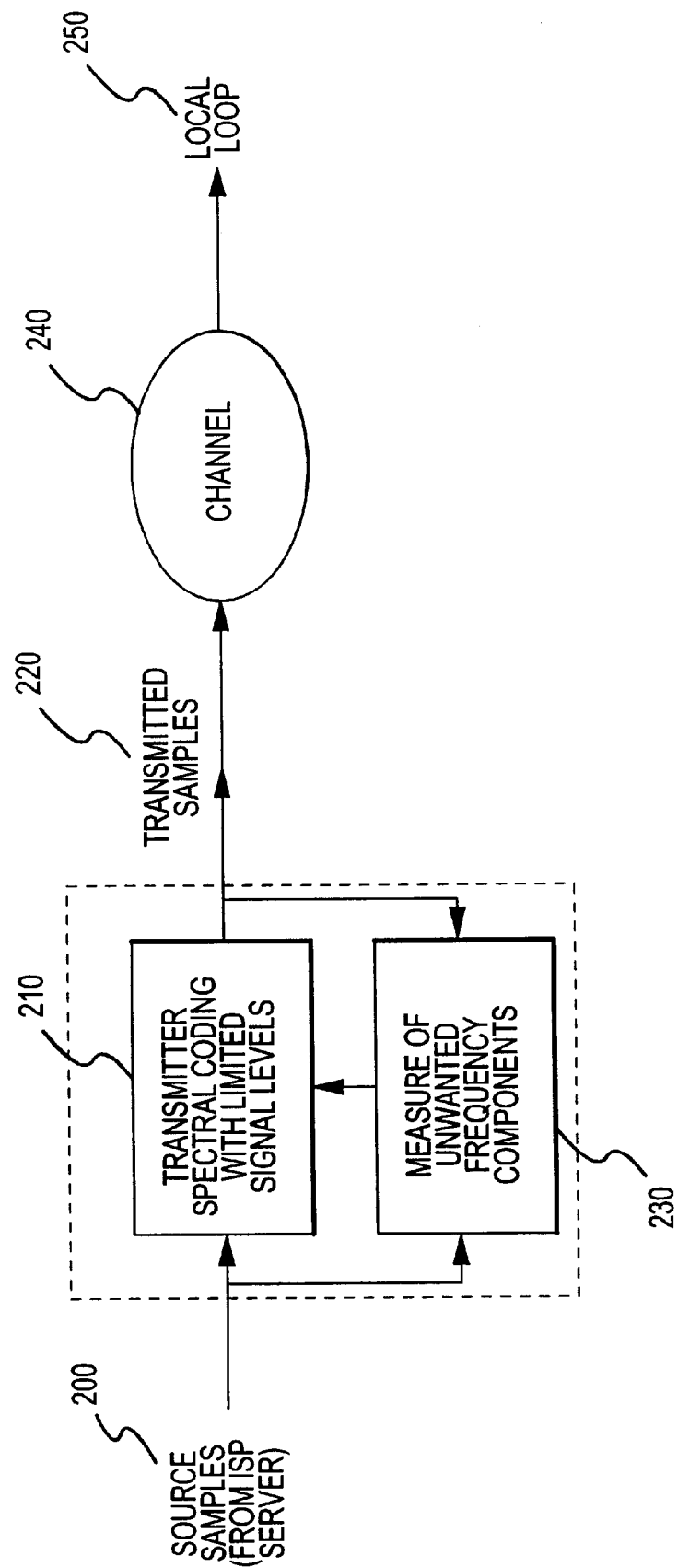
FIG. 2 illustrates a block diagram of the preferred environment of the spectrum control and shaping in accordance with one aspect of the present invention.

FIG. 2 illustrates a block diagram showing one environment where the spectral shaping in accordance with one aspect of the present invention is applicable. Source samples 200 from a data source, such as the ISP's server, are transmitted by a transmitter 210 (of an ISP modem) to generate transmitted samples 220. The transmitted samples 220 are transmitted through a channel 240 to the local loop and eventually the user 250.

Those skilled in the art will recognize that the channel 240 is PCM-based with a limited set, i.e., 255 in $\mu$-law or A-law, of signal levels, since it is specified by the telephone networks. Those skilled in the art will also appreciate that the transmitter 210 must be one using lossless coding such that no information is lost between source samples 200 and transmitted samples 220. To avoid sending the low-frequency energy to the channel 240, the low-frequency component must be eliminated (230) as the source samples 200 are coded by the transmitter 210 based on a set of characteristics of the frequency spectrum. In other words, the running digital sum ("RDS") of any block of source samples must be minimized, which means that the low frequency energy is partially offset or entirely eliminated. Also, there must be redundancy added to ensure a lossless coding by the transmitter.

The conventional way of making RDS bounded is to use an Alternate Marking Input ("AMI") method, which generates additional, but opposite, voltage levels for the samples to bring the RDS to within a symbol size. The AMI, however, is unacceptable for PCM channels, since there is a fixed set of signal points, or voltage levels for the PCM channel as dictated by the telephone networks.

Figure 3:
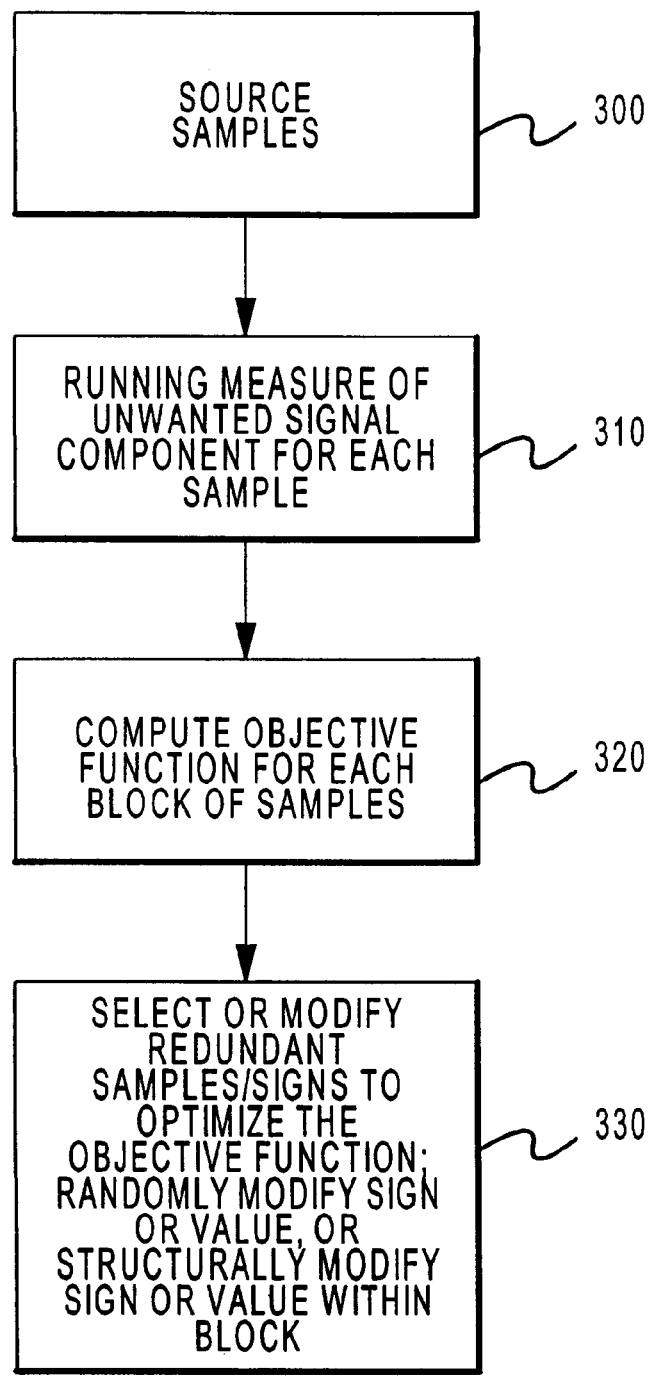
FIG. 3 illustrates a generalized process flow of lossless spectrum shaping and control in accordance with the present invention.

Referring to FIG. 3, a generalized process flow of the spectral shaping methodology in accordance with one aspect of the present invention is shown. First, a block of source samples 300 is applied to the transmitter for coding based on a set of predetermined characteristics of the transmit frequency spectrum. For each sample, a predetermined component is measured (310).

Broadly, the measure of the unwanted signal components of the transmitted samples up to the current sample can be accomplished using a Running Filter Sum (RFS). If the corresponding filter coefficients are selected to be a Fourier basis function, then the measure becomes Running Discrete Fourier Transform (RDFT) or Running Fast Fourier Transform (RFFT). It is more convenient to use RDFT or RFFT to form a set of frequency null. If only DC is of concern, then the measure reduces to RDS.

For every block of a predetermined number of transmitted samples, an objective function is computed (320) based on the measure already obtained. Note that the objective functions may be computed using any one of the following well-known techniques:

a) L-2 Norm of the measurement;

b) L-1 Norm of the measurement;

c) L-$\alpha$ Norm (for 1<$\alpha$<2);

d) a weighted version of L-2 Norm;

e) a weighted version of L-1 Norm;

f) a weighted version of L-$\alpha$ Norm (for 1<$\alpha$<2).

Finally, for every block of source samples, at least one redundant sample is added or at least one source sample is modified (330), e.g., the sign of the sample is modified, such that it will optimize the objective function. When the objective function is optimized, the unwanted signal component is minimized, e.g., the energy of the unwanted signal component is minimized.

It should be noted that the source samples are not intended to be limited to real values. However, for illustration purposes in the disclosure, only real numbers are considered.

It should be apparent to those skilled in the art that when applied to the energy at 0 Hz, the methodology will minimize the unwanted DC component in the transmitted samples. As can be appreciated by those skilled in the art, the system will provide arbitrary spectral-shaping, or coding, of the transmitted samples, whatever the characteristics of the transmit spectrum require.

The following description will first disclose the present invention in the context of spectral shaping in a simple DC null, followed by spectral shaping in multiple frequency nulls and then, eventually, spectral pre-coding based on a predetermined spectrum shape.

For the purposes of illustration in the following description, transmitted samples can be classified as source samples and dependent samples, where the source samples are unmodified and the dependent samples are either redundant samples or modified source samples, e.g., sign-modified, or both. In all measures described herein, the location of the dependent sample can be anywhere in the block, structurally (including pseudo-randomized) or randomly. If randomly located, the location index must be transparent to the receiver, i.e., encoded into the transmitter sequence. For simplicity of the description below, we assume the locations of the dependent samples remain the same for all the blocks. Those skilled in the art can readily adapt the present invention for those scrambled locations based on the teaching of the present invention.

A. A Simple DC Null

In accordance with the present invention, the effect of the DC nulls of the transformer hybrids at the PCM CODEC can be avoided by creating a DC-null in the transmit spectrum.

1) Redundant Sample

This can be done by letting every $L^{th}$, e.g., L=16, sample counteract the DC introduced by previous samples.

Given the output signal $x_n$, let us define a DC measurement $c_n$, $$c_n = \sum_{m=0}^{n} x_m.$$

Figure 4:
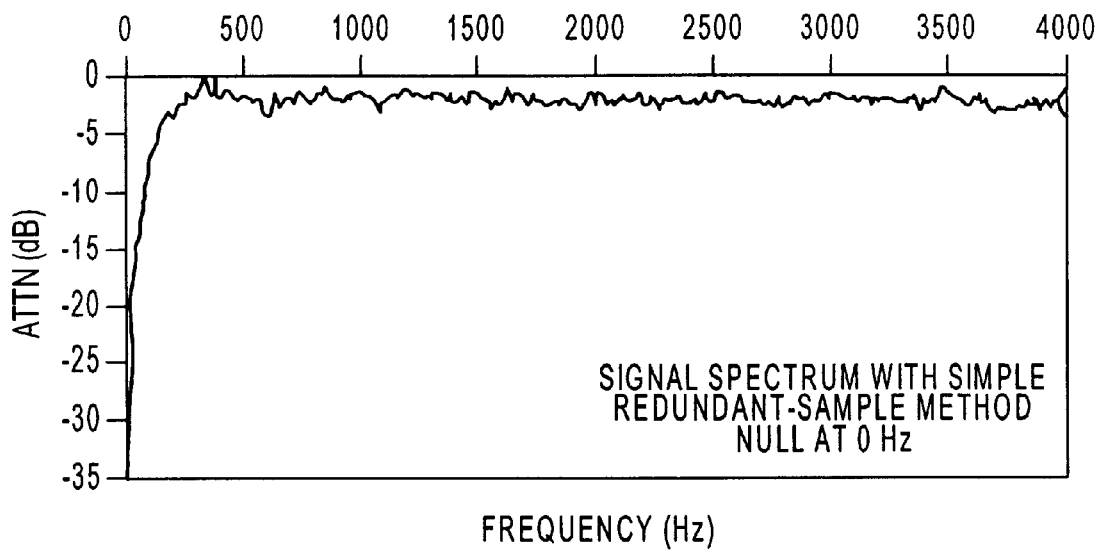
FIG. 4 illustrates the signal spectrum with simple redundant-sample method, where the null is at 0 Hz.

This is commonly known as the RDS approach. If, when n is a multiple of L, we let $x_n=Q(-c_{n-1})$, where Q(.) quantizes its input to the closest value in the PCM DAC, the DC component of the signal will be greatly attenuated, in that:

$$x_n = \begin{cases} M(d_n) & \text{if } n \neq Lr \\ Q(-c_{n-1}) & \text{if } n = Lr \end{cases}, \quad r \text{ is a non-negative integer,}$$

where M is a suitable mapping function from data to a subset of the PCM quantization values. FIG. 4 illustrates the signal spectrum using simple redundant-sample method, where the null is at 0 Hz. 2) Redundant Sign Another method to create a DC null is to modify the sign of every L, e.g., L=2, sample based on $c_{n-1}$, then, $$x_n = \begin{cases} M(d_n) & \text{if } n \neq Lr \\ sgn(-c_{n-1})M'(d_n) & \text{if } n = Lr \end{cases}, \quad r \text{ is a non-negative integer,}$$

where M' only selects positive quantization values. Clearly, $d_n$ should preferably have one less bit when n=L k.

Figure 5:
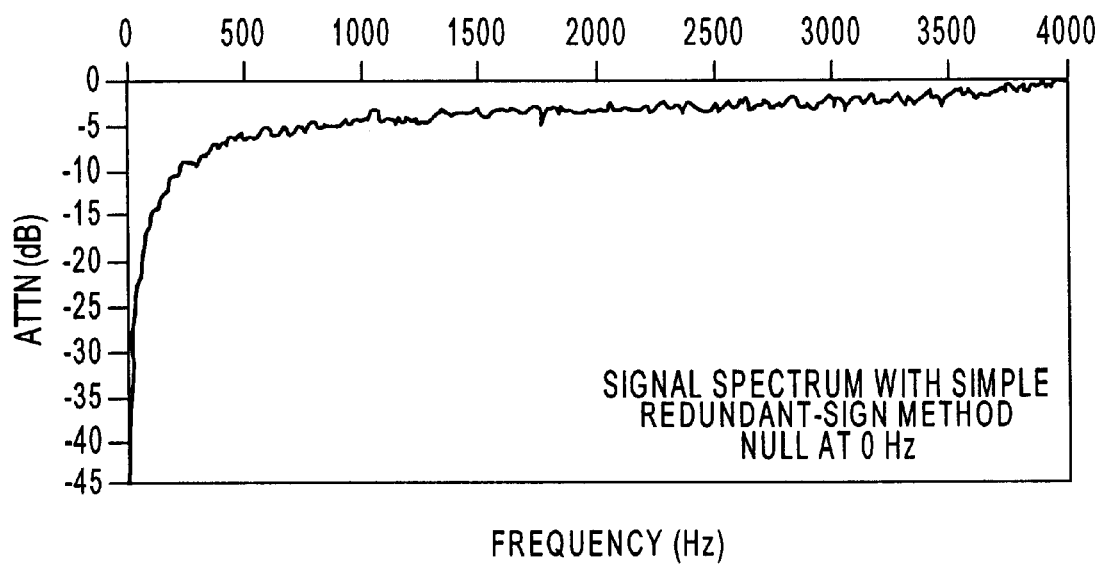
FIG. 5 illustrates the signal spectrum with simple redundant-sign method, where the null is at 0 Hz.

FIG. 5 illustrates the signal spectrum with simple redundant-sign method, where the null is at 0 Hz.

As can be observed from FIGS. 4 and 5, both methods create a DC-null in the transmit spectrum without much effect on the spectrum above 100 Hz. The receiver will not have to reconstruct the signal component at DC, thus greatly simplifying the receiver circuit.

B. Creating Nulls at Individual Frequencies

1) Single Frequencies

The above-described methods can be generalized, or extended, to insert nulls (or rather, near-nulls) at any frequencies. Let us define $c_n^{(k)}$ (now a complex number) as, $$c_n^{(k)} = \sum_{m=0}^{n} x_m e^{-j\omega_k m},$$

where $\omega_k$ represents the frequency $f_k = \omega_k/2\pi T$ with symbol period T. If we make every $L^{th}$, e.g., L=16, sample dependent, then we select the dependent samples to minimize $|C_n^{(k)}|^2$. It should be noted that L is not restricted to 16 in any sense and those skilled in the art can readily apply a different value in accordance with their special applications. It can readily be shown that the best selection for $x_n$ is then, $$x_n = Q(-Re[c_{n-1}^{(k)} e^{j\omega_k n}]).$$

It is then possible to have a generalization for the DC-null redundant-sample method as:

$$x_n = \begin{cases} M(d_n) & \text{if } n \neq Lk \\ Q(-Re[c_{n-1}^{(k)} e^{j\omega_k n}]) & \text{if } n = Lk \end{cases}, \quad \text{e.g., } L = 16.$$

Figure 6:
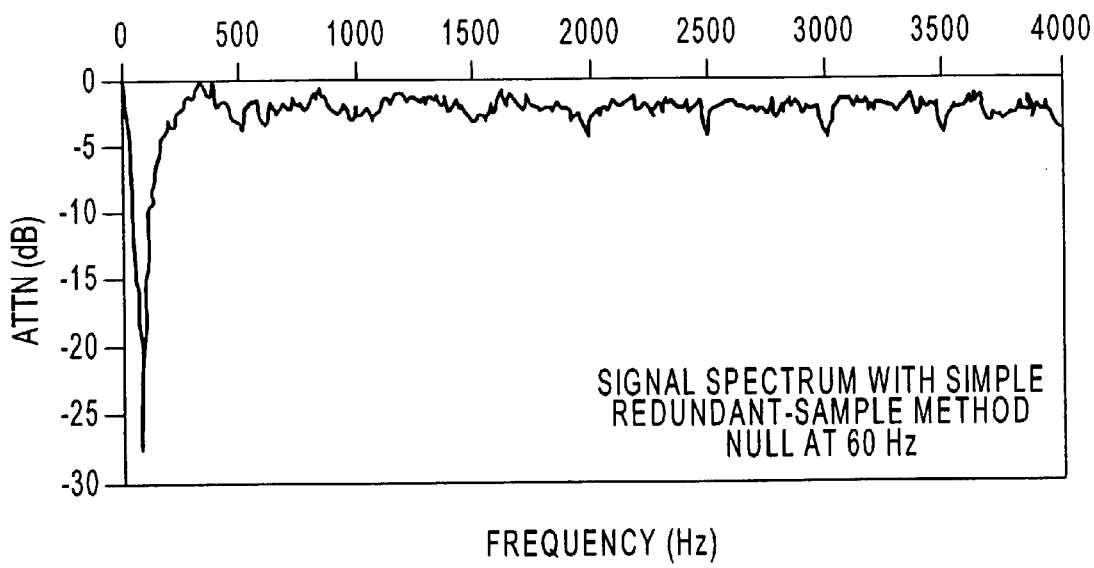
FIG. 6 illustrates the signal spectrum with simple redundant-sample method, where the null is now at 60 Hz.

FIG. 6 illustrates the signal spectrum with simple redundant-sample method, where the null is now at 60 Hz.

A generalization for the DC-null redundant-sign method is now, $$x_n = \begin{cases} M(d_n) & \text{if } n \neq Lr \\ sgn(-Re[c_{n-1}^{(k)} e^{j\omega_k n}])M'(d_n) & \text{if } n = Lr \end{cases}, \quad \text{e.g., } L = 2.$$

Figure 7:
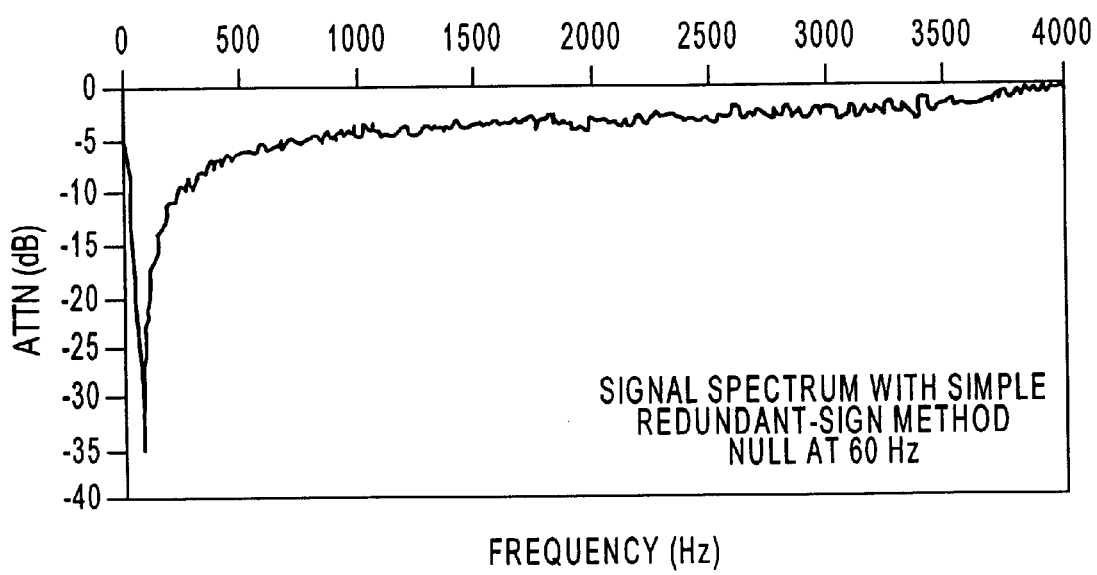
FIG. 7 illustrates the signal spectrum with simple redundant-sign method, where the null is at 60 Hz.

FIG. 7 illustrates the signal spectrum with simple redundant-sign method, where the null is at 60 Hz. As can be observed by those skilled in the art, if $\omega_k$=0, this becomes the same as the special case with the DC null.

2) Multiple Frequencies

The generalized method as described above can in fact be done at more than one frequency. If we define asset of $\omega_k$, k=0,1,..., K−1, and minimize the sum of the squared norms of $c_n^{(k)}$, it can be found that the best selection for $x_n$ for the redundant sample method is, $$x_n = \begin{cases} M(d_n) & \text{if } n \neq Lr \\ Q(-C_n) & \text{if } n = Lr \end{cases},$$

where $$C_n = \frac{1}{K} \sum_{k=0}^{K-1} Re[c_{n-1}^{(k)} e^{j\omega_k n}],$$

and for the redundant sign method, $$x_n = \begin{cases} M(d_n) & \text{if } n \neq Lr \\ sgn(-C_n)M'(d_n) & \text{if } n = Lr \end{cases}.$$

If the goal is to suppress a band of frequencies, then those skilled in the art can readily replace summation ($\Sigma$) with integration ($\int$) in calculating $C_n$.

Figure 8:
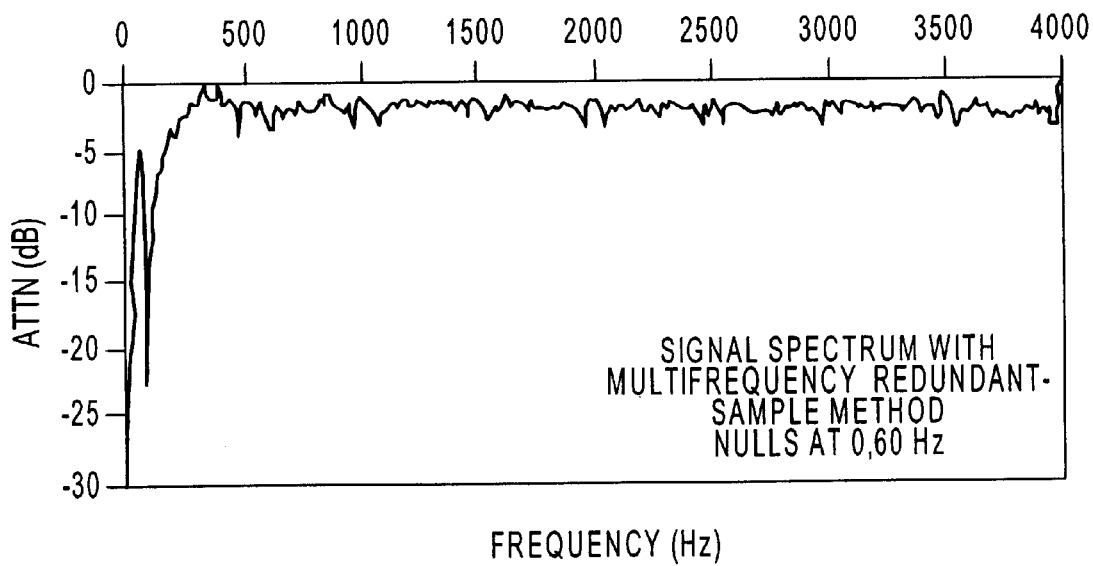
FIGS. 8 and 9 illustrate the signal spectrum with multiple frequency redundant-sample and multiple frequency redundant-sign methods, respectively, with nulls at 0 Hz and 60 Hz.
Figure 9:
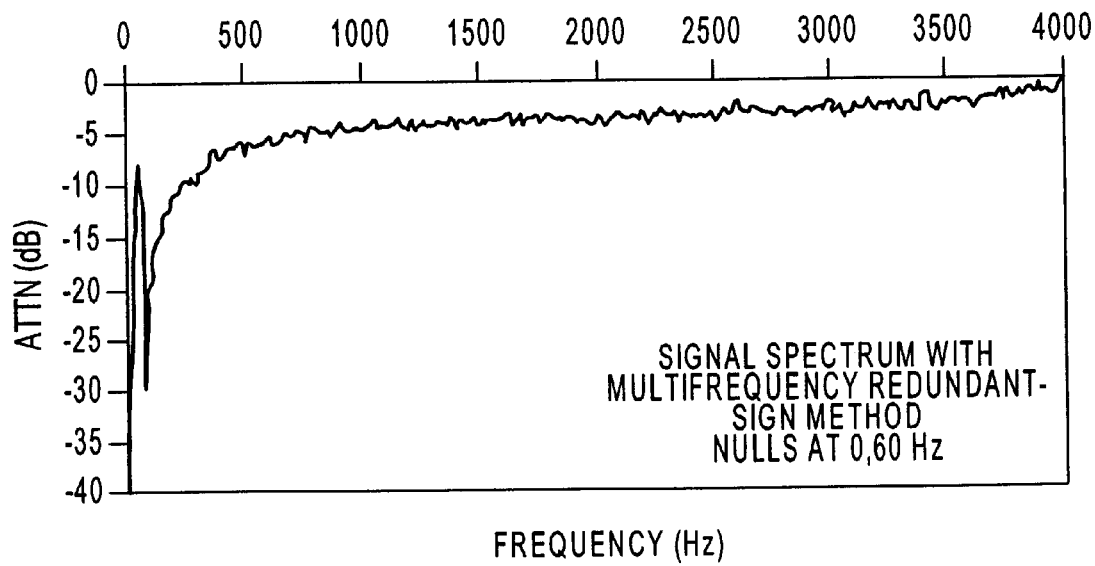

FIGS. 8 and 9 illustrate the signal spectrum with multiple frequency redundant-sample and multiple frequency redundant-sign methods, respectively, with nulls at 0 Hz and 60 Hz.

C. Block Coding of Redundant Samples

The performance of the above-described redundant-sample method can be further enhanced by considering blocks of data and jointly optimizing several redundant samples.

If we make every $L^{th}$, e.g., L=16, sample redundant, then we can consider jointly optimizing N redundant samples in a super block of (N×16) samples. That is, $x_n, x_{n-16}, \ldots, x_{n-(N-1)*16}$ are selected simultaneously to minimize the sum of squared norms of $c_n^{(k)}$. It will be appreciated by those skilled in the art that the N jointly optimized redundant samples $x_n, x_{n-16}, \ldots, x_{n-(N-1)*16}$, without quantization, are roots of the following linear equation: A x=b, where $$A = \begin{Bmatrix} K & \sum_{k=0}^{K-1} \cos(16w_k) & \cdots & \sum_{k=0}^{K-1} \cos(16(N-1)w_k) \\ \sum_{k=0}^{K-1} \cos(16w_k) & K & \cdots & \vdots \\ \vdots & \vdots & \ddots & \sum_{k=0}^{K-1} \cos(16w_k) \\ \sum_{k=0}^{K-1} \cos(16(N-1)w_k) & \cdots & \sum_{k=0}^{K-1} \cos(16w_k) & K \end{Bmatrix}$$

$$x = \begin{Bmatrix} x_n \\ x_{n-16} \\ \vdots \\ x_{n-16(N-1)} \end{Bmatrix}$$

$$b = -\begin{Bmatrix} \sum_{k=0}^{K-1} \text{Re}[c_{n-1}^{(k)} e^{jw_k n}] \\ \sum_{k=0}^{K-1} \text{Re}[c_{n-1}^{(k)} e^{jw_k(n-16)}] \\ \vdots \\ \sum_{k=0}^{K-1} \text{Re}[c_{n-1}^{(k)} e^{jw_k(n-(N-1)16)}] \end{Bmatrix}$$

Here the term $c_{n-1}^{(k)}$ is $$c_{n-1}^{(k)} = \sum_{\substack{m=0 \\ m \neq n-16, n-32, \\ \cdots n-16(N-1)}}^{n-1} x_m e^{-j\omega_k m},$$

which is slightly different from before.

When each entry of x can only take a value from a finite set of quantization values, the exact solution of x will be replaced by its quantized version. A simple way to get a quantized version of roots of the above linear equation is to independently quantize each of the entries. A more preferred way is to jointly quantize the whole vector by searching through a small neighborhood of x and finding the quantized candidate vector which minimizes the sum of the squared norms of $c_n^{(k)}$.

It should readily be appreciated by those skilled in the art that using FFT to perform coding of redundant samples is a nominal extension of the above-described methodology. In that case, $$c_n^{(k)} = \sum_{m=0}^{n} x_m e^{-j\omega_k m},$$

will be replaced by $$c_P^{(k)} = \sum_{m=0}^{P-1} x_m e^{-j\frac{2\pi k}{P} m},$$

where $c_P^{(k)}$ corresponds to the FFT at the actual frequency of $f_k = k/PT$.

D. Block Coding of Redundant Signs

The Redundant Sign method, described above, can be further improved by considering blocks of data. Several signs within the block can be selected in combination to optimize. For example, if we consider a block of 4 samples and first select positive quantization points for each sample based on the input data, assuming a redundancy of $\frac{1}{16}$, we then need to encode 2 more bits for the block, and have 2 degrees of freedom. We now want to select the set of 4 signs $S_n = (s_n, s_{n+1}, s_{n+2}, s_{n+3})$ to minimize the energy at the selected frequencies $f_k$, given $x'_{n+l} = M'(d_{n+l})$, $l=0,1,2,3$ and $c_{n-1}^{(k)}$, $k=0,1,\ldots,K-1$.

In effect, we want to direct the vector $X'_n = (x'_n, x'_{n+1}, x'_{n+2}, x'_{n+3})$ in such a way as to minimize $C_n$. We are restricted by 2 bits, but the other 2 bits can be selected. Suppose the set of possible $S_n$ is divided into 4 subsets $A_i$, i=0, 1, 2, 3, and a subset is selected based on the input bits, $S_n$ is selected out of the four subset members to minimize $C_n$. Then we would want the elements of each subset to be as different from each other as possible, in order to handle a variety of different $X_n$ well.

One way to spread the $S_n$ is to construct a binary code, where each subset has members with maximum distance between them, and the subsets are co-sets of each other. One example would be:

$A_0 = (0000, 0011, 1100, 1111)$
$A_1 = (0001, 0010, 1101, 1110)$
$A_2 = (0100, 0111, 1000, 1011)$
$A_3 = (0101, 0110, 1001, 1010)$ where the binary codes represent the sign combinations where a "0" represents "+", and a "1" represents "−". Here, the 2 data bits would select one of the 4 subsets, and then the sign combinations in each subset would be tested to find which one gave the lowest $C_n$.

That sign combination could then be used to multiply the positive input samples. In the receiver, the decoding operation would identify the signs. The receiver would then find to which subset the sign combination belonged, and output the 2 bits corresponding to that subset.

As can be observed by those skilled in the art, an interesting side-benefit is that for each subset, the negative of each member of the subset is also in the subset. Thus, if the signal gets multiplied by −1 in the channel, the resulting subset sequence is unchanged. Therefore, no differential encoding/decoding is necessary since the coding system is sign-invariant.

Figure 10:
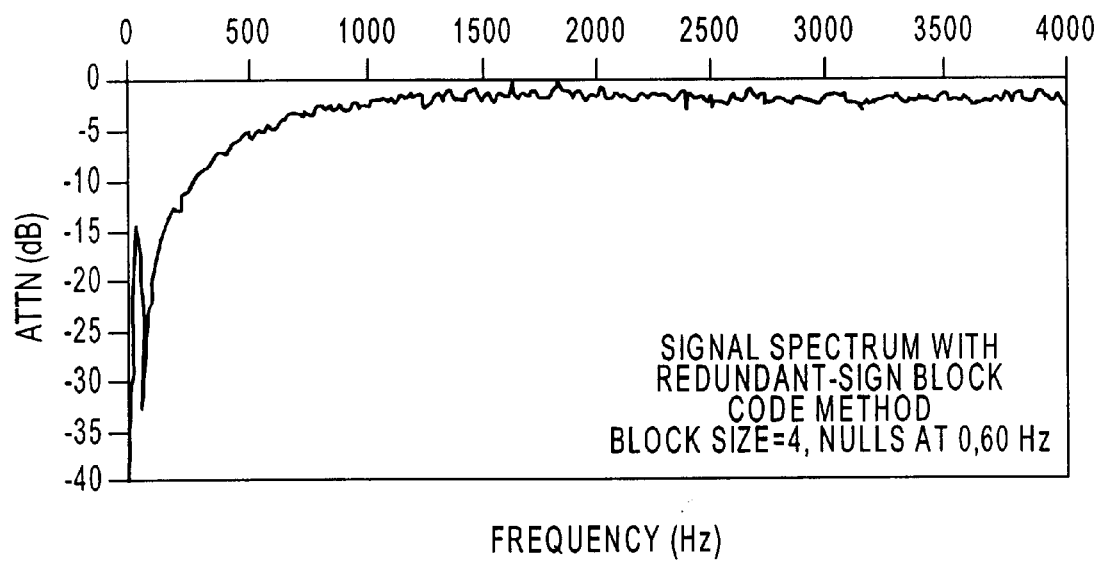
FIGS. 10 and 11 illustrate the signal spectrums with redundant-sign block code method, where block size is 4 and nulls at 0, 60 Hz and 0, 30, 60 Hz, respectively.
Figure 11:
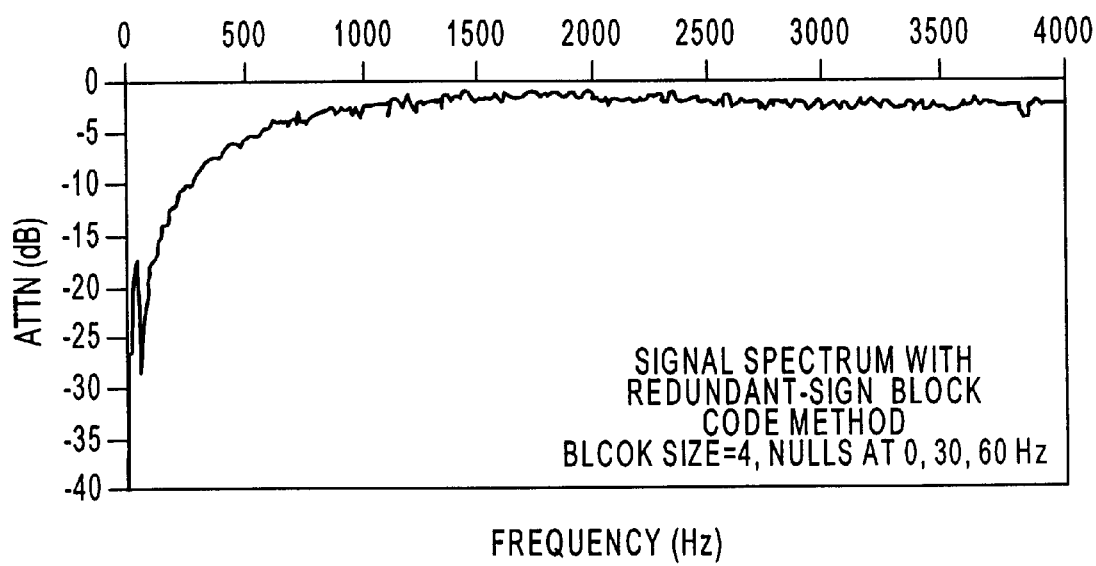

FIGS. 10 and 11 illustrate the signal spectrums with redundant-sign block code method, where the block size is 4, with nulls at 0, 60 Hz and 0, 30, 60 Hz, respectively.

As can be expected, the larger the subset, the better the performance. One example of a subset structure for a block length of 8, where one still assumes a redundancy of $\frac{1}{16}$, is illustrated in Table 1 (using hexadecimal notation).

Figure 12:
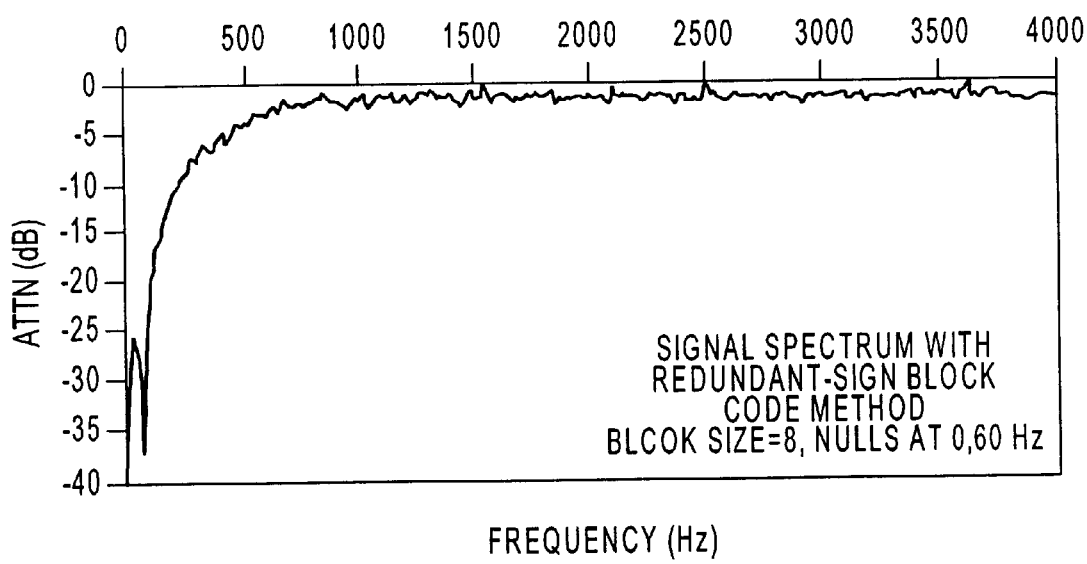
FIGS. 12 and 13 illustrate the signal spectrum for the block size of 8, inserting nulls at 0, 60 Hz and 0, 6, 12, 18, . . . , 60 Hz, respectively.
Figure 13:
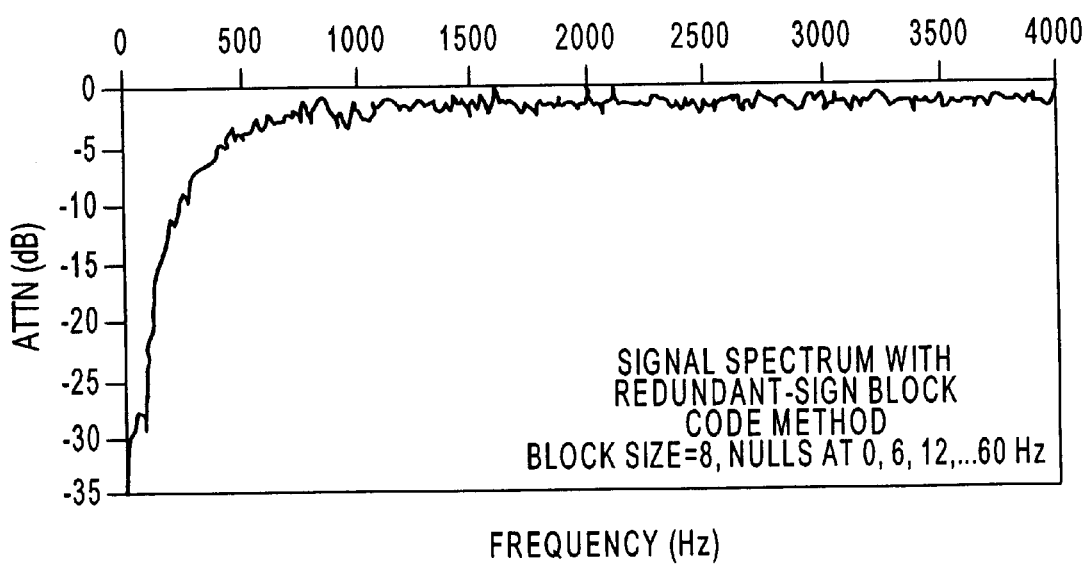

FIGS. 12 and 13 show the signal spectrum for a block size of 8, inserting nulls at 0, 60 Hz and 0, 6, 12, 18, . . . , 60 Hz, respectively.

If more attenuation is desired, the block size can be increased to 16 or even higher, although the computational complexity will grow considerably. The redundancy may also be increased. For a redundancy of ⅛, all sign-bits are available for manipulation. This will increase the low-frequency attenuation over that shown in FIGS. 9 and 10 by more than 10 dB.

E. Spectral Precoding According to a Specified Spectral Shape

The foregoing methods can be further generalized to shape a transmitted sequence spectrum with respect to a specified spectral characteristic. Let the z-transform of the desired spectral shaping function be G(z) and its inverse be defined as:

$$F(z) = 1/G(z) = \sum_{m=-\infty}^{\infty} f_m z^{-m},$$

where the filter coefficient, $f_m$, can be complex-valued.

In practice, we might be only interested in the cases where F(z) is causal, i.e., $f_m=0$, for all m<0, or we may use a delayed and windowed version of F(z). In addition, we might prefer F(z) to be minimum phase. This can be done by selecting an all-pass filter A(z), such that F(z) is minimum phase and $$F(z) = \frac{A(z)}{G(z)},$$

where $|F(e^{-j\omega})|=1/|G(e^{-j\omega})|$, and F(z) is assumed to be causal and stable. Once we have obtained the desired filter coefficients $\{f_m\}$, the unwanted signal component contained in the available sequence $\{x_m\}$ for $0 \leq m \leq n$ at epoch n can be written as:

$$c_n = \sum_{m=0}^{n} x_m f_{n-m}.$$

Its energy can be reduced or completely canceled by jointly optimizing several redundant samples which will be selected with respect to the dominant weights of $f_m$ or jointly selecting several redundant signs. These two methods are similar to the aforementioned block coding with redundant samples and block coding with redundant signs.

The only difference is in the performance measure. To state clearly, we define the set of L dominant tap indices of $f_m$ as $\Im$. Then for each block of N samples, where suppose N>max$\{\Im\}$, we select L redundant samples $x_{n-l}$, $\forall l \in \Im$ subject to saturation and quantization constraints of PCM signaling or select L redundant signs $S_{n-l}$, $\forall l \in \Im$ such that $|c_n|^2$ is minimized. The search of the optimal redundant samples or signs is straightforward. Any of the constrained linear programming algorithms would be sufficient, as can be appreciated by those skilled in the art.

For illustration purposes, we consider a special case where the most dominant tap is $f_0$. Further, we assume $f_0$ is real-valued without loss of generality. For this case, it is reasonable to modify the current sample $x_n$ according to $c_{n-1}$ to minimize $|c_n|^2$. The parameter $c_{n-1}$ here is referred to as a running filter sum (RFS) at time n-1. If the "redundant-sample" method is employed for each block of N samples, then the desired sequence can be constructed as $$x_n = \begin{cases} M(d) & \text{if } n \neq rL \\ Q(-c_{n-1}/f_0) & \text{if } n = rL \end{cases}.$$

If the "redundant-sign" method is used, then the desired sequence is given as $$x_n = \begin{cases} M(d_n) & \text{if } n \neq rL \\ sgn(-c_{n-1}/f_0)M'(d_n) & \text{if } n = rL \end{cases},$$

where $M'(d_n)=|M(d_n)|$. It can be shown that as long as the RFS is bounded, the constructed sequence satisfies the specified spectral requirements. Note that if we choose $G(z)=1-z^{-1}$, then $f_m=1$ for all $m \geq 0$. The RFS then reduces to running digital sum, or RDS. If we choose $G(z)=1-e^{-j\omega}z^{-1}$, then $f_m=e^{-j\omega m}$ for all $m \geq 0$ and a given normalized frequency ω. The RFS reduces to RFT.

To demonstrate the effectiveness of the various methods in accordance with the present invention, we consider G(z)= $1-z^{-2}$, a so-called modified duo-binary signal. This class of sequences does not possess a sharp discontinuity at the Nyquist frequency and, as a result, can be easily approximated by a physically realizable filter. It can be shown that the corresponding inverse filter is given as, $$F(z) = \sum_{m=0}^{\infty} z^{-2m},$$

where we select (ROC) $|z|<1$.

Accordingly, we can use two separate RDSs to account for the even samples and the odd samples respectively, $$c_n = \begin{cases} \sum_{m=0}^{n/2} x_{2m} & \text{if } n \text{ is even} \\ \sum_{m=0}^{(n-1)/2} x_{2m+1} & \text{if } n \text{ is odd} \end{cases}.$$

The sequence $\{x_n\}$ can be constructed by any of the aforementioned methods.

Figure 14:
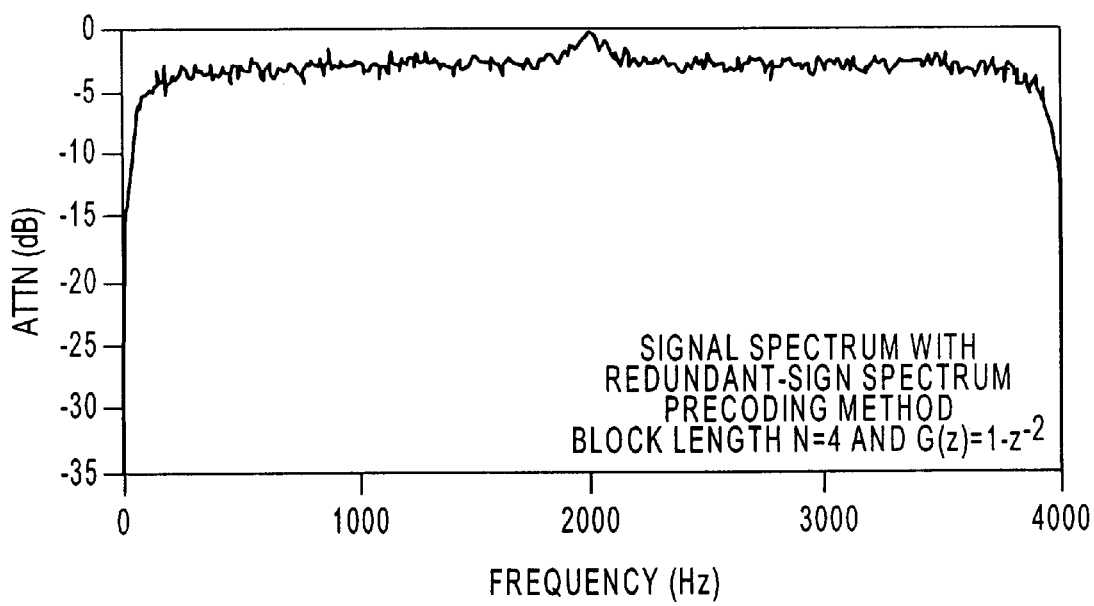
FIG. 14 illustrates the signal spectrum of the sequence constructed by the redundant-sign method for a block length of N=4 with a redundancy of 1/16.

FIG. 14 shows the power spectrum of the sequence constructed by the redundant-sign method for a block length of N=4 with a redundancy of ¹⁄₁₆.

Figure 15:
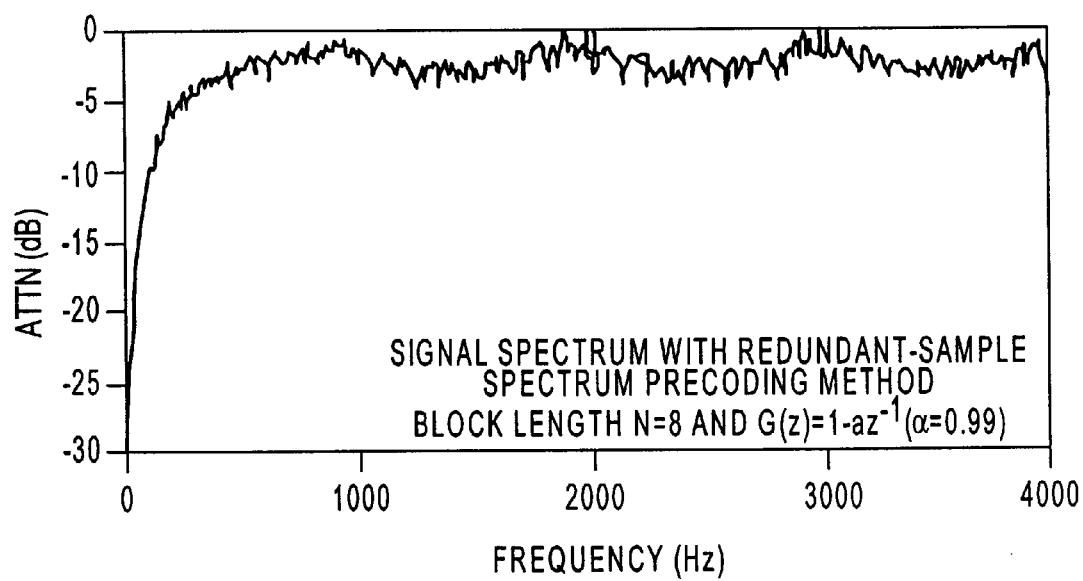
FIG. 15 illustrates the signal spectrum of the sequence constructed by the redundant-sample method.

The last example considers $G(z)=1-\alpha z^{-1}$ where the weighting factor α, or forgetting factor, can be used to control the memory of the residual RDS at the cost of slightly lower attenuation at DC. FIG. 15 shows the power spectrum of such sequence constructed by the redundant sample method, where N=8, α=0.99.

F. Selection of Redundancy

In most of the examples described above, a redundancy of ¹⁄₁₆ samples for the redundant sample method or ½ bit for the redundant sign method has been assumed. Generally, a higher level of redundancy will allow greater control over the transmit spectrum, but at the cost of constellation expansion which may significantly decrease the minimum distance between signal points. In some cases it may therefore be appropriate to vary the redundancy according to channel conditions. Given the non-uniform quantization levels of μ-law and A-law CODECs, the constellation expansion required for the above redundancy can become quite costly, resulting in as much as a 12 dB reduction in minimum distance between signal points. In many cases, the benefit of the spectrum control will be much less. By selecting the redundancy based on channel conditions and/or data rate, significant improvements in performance may be achieved.

For example, a transmission system with multiple data rates may fix the redundancy at a low level for high data rates, and at a higher level for lower data rates. Thus, at high rates, which could only be achieved on good channels, where generally less spectral optimization is needed, the redundancy could be as low as 1/16 bits (1 bit every 16 samples) using a redundant-sign algorithm, or even be completely omitted. At lower rates, the redundancy could be increased to 1/8 and then 1/4 and 1/2 bits at the lowest rates.

Another example is a transmission system where characteristics of the channel could be measured, and the redundancy selected based on the measurements. For instance, if high amounts of nonlinear transformer-hybrid distortion are detected, the redundancy would be increased to allow the spectrum control system to reduce transmitted energy at low frequencies to avoid much of the distortion. If additive tonal interference is detected, such as 50 or 60 Hz tones and harmonics thereof, the redundancy could be increased to allow for near-nulls in the transmit spectrum at the interfering frequencies.

Further, if the channel's frequency response is measured such that receiver equalization can be expected to introduce noise enhancement, redundancy can be increased as required to allow optimum pre-emphasis as discussed, for example, in E. Lee and D. Messerschmitt, "Digital Communication," Kluwer Academic Publishers, 1994, or B. P. Lathi, "Modern Digital Communication Systems," Section 6.5, Holt Rinehart and Winston, Inc., 1989. In this way, the trade-off between redundancy and spectral shaping can be optimized to achieve the highest possible data signaling rate.

It will be recognized that the cost functions presented above can be used for a variety of mapping methods. Likewise, various mapping schemes may be modified to improve their performance with respect to the mapping algorithm. One method of spectral shaping for PCM modems is to use a set of L non-uniformly spaced signal points, labeled $x(0), x(1), \ldots, x(L-1)$, which are divided in two subsets, those for which the index is in the range L−N to N−1 and those for which the index is outside that range. From a set of input bits, a mapping index n in the range of 0 to N−1 is first calculated. If $n \geq L-N$, signal point n is transmitted. If $n<L-N$, either signal point $x(n)$ or $x(n+N)$ is transmitted based on a modified RDS. However, using this method in shell mapping, for example, similar to that in the well-known V.34 standard, the ring index selected in the shell mapping may be modified, which would violate the necessary assumptions made in the shell mapping algorithm.

An alternative scheme according to the present invention, provides for the selection of either signal point $x(n)$ or $x(L-1-n)$, depending on either a simple RDS or one of the cost functions according to embodiments of the invention, presented above. Since $x(n) +- x(L-1-n)$, there is no modification to the ring index, and the assumptions made in the shell mapping algorithm would still hold. Hence, it can be understood that the present system for spectrum control and shaping is transparent to shell mapping, for example, among other mapping schemes.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method of lossless spectral shaping or coding of source samples to transmitted samples based on a set of predetermined characteristics of a frequency spectrum, where the allowable signal levels of the transmitted samples are limited to a prescribed set, and wherein the transmitted samples are transmitted via a communication channel, said method comprising the steps of:
   a) for each source sample, calculating any one of the following:
      i) an RDS, to obtain a measurement of the DC component of the source sample up to a current block;
      ii) a RDFT or RFFT, to obtain a measure of unwanted signal components of the source sample up to the current block;
      iii) a Running Filter Sum, to obtain a measure of unwanted signal components of the source sample up to the current block;
   b) for every block of a determined plurality ("N") of source samples, computing an objective function based on the measure obtained from Step a), wherein said objective function shapes the source samples to a predetermined spectrum characterized by a set of filter coefficients associated with a transmitter of said transmitted samples;
   c) for every block of said determined plurality ("N") of source samples, selecting one of:
      i) at least one redundant sample,
      ii) at least one redundant sign, or
      iii) both of at least one redundant sample and at least one redundant sign, to optimize the objective function in Step b); and
   d) varying the redundancy of the sample or the sign according to communication channel conditions and characteristics.

2. An apparatus comprising a microprocessor for performing the steps of claim 1, and a semiconductor memory device in communication with the microprocessor for storing the measurement calculated in step (a) and the objective function of steb (b).

3. The method of claim 1, wherein said selecting step comprises the step of:
   selecting the location of the redundant sample such that the location is encoded within the transmitted sequence.

4. The method of claim 1, wherein the objective function is the sum of the squares of the output of the running measure over the block of transmitted samples.

5. A method of lossless spectral shaping or coding of source samples to transmitted samples based on a set of predetermined characteristics of a frequency spectrum, where the allowable signal levels of the transmitted samples are limited to a prescribed set, and wherein the transmitted samples are transmitted at a transmit data rate, said method comprising the steps of:
   a) for each source sample, calculating any one of the following:
      i) an RDS, to obtain a measurement of the DC component of the source sample up to a current block;
      ii) a RDFT or RFFT, to obtain a measure of unwanted signal components of the source sample up to the current block;
      iii) a Running Filter Sum, to obtain a measure of unwanted signal components of the source sample up to the current block;

b) for every block of a determined plurality ("N") of source samples, computing an objective function based on the measure obtained from Step a), wherein said objective function shapes the source samples to a predetermined spectrum characterized by a set of filter coefficients associated with a transmitter of said transmitted samples;

c) for every block of said determined plurality ("N") of source samples, selecting one of:
   i) at least one redundant sample,
   ii) at least one redundant sign, or
   iii) both of at least one redundant s ample and at least one redundant sign, to optimize the objective function in Step b); and d) varying the redundancy of the sample or the sign according to the transmit data rate.

6. A method according to claim 5, wherein said redundancy is determined to be lowest at a high transmit data rate and highest at a low transmit data rate.

7. The method of claim 5, wherein the objective function is the sum of the squares of the output of the running filter sum or running digital sum over the block of samples.

8. A system for controlling and shaping, transmitted data samples having predetermined frequency characteristics and allowable transmit signal levels, wherein the transmitted samples are transmitted by a transmitter, and are arranged in blocks having structured or random locations, the system comprising:

a microprocessor for
   calculating for each of the transmitted samples, a running measure of unwanted components up to a current sample,
   computing for each block of the transmitted samples, an objective function based on the running measure, wherein said objective function shapes the source samples to a predetermined spectrum characterized by a set of filter coefficients associated with said transmitter,
   selecting, for each block of the transmitted samples, at least one redundant sample to be added or at least on transmitted sample within the corresponding block to be modified to optimize the objective function; and a semiconductor memory device for storing and enabling the microprocessor to access the running measure, the objective function, and the redundant sample.

9. A system according to claim 8, wherein each block includes structured or random locations of transmitted sample, such that the location of the redundant sample may be fixed, scrambled, or random.

10. A communications system having, a limited number of signal points, for controlling and shaping the spectrum of data samples transmitted at a transmit data rate over a communications channel between a transmitter and a receiver, the receiver providing measurements of channel conditions, wherein the data samples are transmitted in blocks, the system comprising:

a microprocessor in communication with the transmitter, for
   processing the receiver measurements,
   determining a desired amount of redundancy to be added to the sample blocks in accordance with the receiver measurements,
   adding the desired redundancy to the sample blocks to shape the sample blocks to a predetermined spectrum characterized by a set of filter coefficients associated with said transmitter; and a semiconductor memory device receiving and storing the receiver measurements, and the desired amount of redundancy determined by the microprocessor.

11. A system according to claim 10, wherein the channel conditions may include detection of nonlinear transformer-hybrid distortion, additive tonal interference, and noise spectrum, such that in response to such channel conditions, the microprocessor causes the desired amount of redundancy to be increased.

12. A system according to claim 11, wherein the receiver measurements include estimates of non-linear distortion.

13. A system according to claim 11, wherein the receiver measurements include estimates of channel frequency response.

14. A system according to claim 11, wherein the receiver measurements include estimates of noise spectrum.

15. A system according to claim 11, wherein the receiver measurements include estimates of signal-to-noise ratio.

16. A system according to claim 10, wherein the data samples are defined by a plurality of bits and are transmitted in blocks, further wherein, at high transmit data rates, a redundancy of one, six, eight, twelve, or sixteen bits every 16 samples is added, and at lower transmit data rates, the redundancy is increased.

17. A system according to claim 10, wherein, at high transmit data rates, where the receiver measurements indicate that the channel conditions are good, minimal redundancy is added.

18. A system according to claim 10, wherein the amount of redundancy to be added varies in accordance with the transmit data rate.

19. A method for spectrally shaping transmitted samples having a predetermined set of frequency characteristics and a predetermined set of allowable transmitted signal levels, wherein N transmitted samples form a block of transmitted samples, comprising the steps of:

a) selecting the amplitudes of signal levels in a block based upon user data;

b) selecting an M-element subset of the $2^N$ possible sign combinations based upon user data;

c) computing an objective function for each of the M sign combinations by applying the signs to the amplitudes of the transmitted signal levels, wherein said objective function shapes the transmitted samples to a predetermined spectrum characterized by a set of filter coefficients associated with a transmitter of said transmitted samples;

d) selecting the sign combination that best optimizes the objective function, wherein the M element sign combinations differ in more than one sign bit;

e) transmitting the signal points using the selected sign combination.

20. The method of claim 19, wherein the $2^N$ sign combinations are partitioned into M-element subsets in such a way as to maximize the Hamming distance between elements in the subsets, considering the signs as 0's and 1's of a binary codeword.

21. The method of claim 19, wherein M is a power of 2.

22. The method of claim 19, wherein N=2, 3, or 6, and $M=2^{N-1}$.

* * * * *